United States Patent
Diggs et al.

(10) Patent No.: US 7,685,374 B2
(45) Date of Patent: Mar. 23, 2010

(54) MULTI-INTERFACE AND MULTI-BUS STRUCTURED SOLID-STATE STORAGE SUBSYSTEM

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 417 days.

(21) Appl. No.: 11/829,023

(22) Filed: Jul. 26, 2007

(65) Prior Publication Data
US 2009/0031073 A1    Jan. 29, 2009

(51) Int. Cl.
  *G06F 13/36* (2006.01)
(52) U.S. Cl. .................. 711/151; 711/103; 711/115
(58) Field of Classification Search .................. None
  See application file for complete search history.

(56) References Cited
U.S. PATENT DOCUMENTS

| | | | |
|---|---|---|---|
| 6,802,023 B2 * | 10/2004 | Oldfield et al. | 714/7 |
| 6,874,044 B1 * | 3/2005 | Chou et al. | 710/62 |
| 2004/0158669 A1 | 8/2004 | Weng et al. | |
| 2005/0055481 A1 | 3/2005 | Chou et al. | |
| 2005/0114587 A1 | 5/2005 | Chou et al. | |
| 2005/0240713 A1 | 10/2005 | Wu et al. | |
| 2006/0161716 A1 | 7/2006 | Lin | |
| 2007/0042767 A1 * | 2/2007 | Stepanian | 455/420 |
| 2007/0061501 A1 | 3/2007 | Lasser | |
| 2007/0101027 A1 | 5/2007 | Li et al. | |

* cited by examiner

*Primary Examiner*—Than Nguyen
(74) *Attorney, Agent, or Firm*—Knobbe, Martens, Olson & Bear, LLP

(57) ABSTRACT

A solid-state storage subsystem, such as a non-volatile memory card or drive, includes multiple interfaces and a memory area storing information used by a data arbiter to prioritize data commands received through the interfaces. As one example, the information may store a priority ranking of multiple host systems that are connected to the solid-state storage subsystem, such that the data arbiter may process concurrently received data transfer commands serially according to their priority ranking. A host software component may be configured to store and modify the priority control information in solid-state storage subsystem's memory area.

35 Claims, 8 Drawing Sheets

MULTI-INTERFACE AND MULTI-BUS STRUCTURED SOLID-STATE STORAGE SUBSYSTEM

BACKGROUND

1. Technical Field

The present invention relates to solid-state storage subsystems. More specifically, the present invention relates to multiple signal interfaces and bus structures for a single solid-state storage subsystem.

2. Description of the Related Art

Solid-state storage subsystems transfer data with host computer systems by means of a wide variety of signal interfaces. A signal interface is typically selected for a particular application based on design constraints facing that application. Design constraints may typically include practical environmental and development matters: the distance separating the storage subsystem and a host system interfaced with the storage subsystem; power consumption; rates of data transfer; design time available on a project; and the cost to implement the bus structure for that signal interface. Because constraints are often similar for similar applications, a particular signal interface may become standard for a given application. For example: the IEEE-1394 signal interface and corresponding bus structure are commonly used for video applications because of the high data rates involved; the USB signal interface and bus structure are commonly used for small data storage applications; and the IDE and SATA signal interfaces and bus structures are used for large data storage and booting applications.

While a particular application may typically call for a particular signal interface, it need not always use that same signal interface. For example, when design time and budget are minimal, an off-the-shelf solution may be used. If a Single Board Computer is used the designer may be limited to using an on-board IDE controller and PATA signal interface regardless of the application because of these time and budget considerations. In this example only a limited number of storage subsystems, those compatible with an PATA signal interface and IDE bus structure, will be compatible with the application host system.

More general industry trends may also cause different signal interfaces and bus structures to be used for similar applications. For example, the IEEE-1394 signal interface and bus structure are commonly used for video applications as stated above. However, the USB 2.0 signal interface has increasingly been used for these types of applications. A storage subsystem relying entirely on either the IEEE-1394 signal interface or USB 2.0 signal interface will therefore not be compatible with a large percentage of systems in the field for which it is designed.

Other host computing systems operate multiple applications, and may face different constraints with each application. The host computing system may therefore have a different signal interface and bus structure for each application, and may therefore require numerous storage subsystems for a single host system.

SUMMARY OF THE DISCLOSURE

Consequently, it would be advantageous to develop systems and methods to support multiple signal interfaces and bus structures within a single storage subsystem.

In certain embodiments disclosed herein, a solid-state storage subsystem may be connected to multiple host systems via multiple bus structures thereby reducing the number of different storage subsystems a manufacturer or designer needs to offer to meet the demands of various end customers.

In one embodiment, a storage subsystem, which may be in the form of a detachable device, includes multiple physical connectors and bus structures for different signal interfaces. Priority control parameters used by a data arbiter are stored in a memory area of the device. The priority control parameters include information on prioritizing data transfer commands received from any number of host systems that are connected to the storage subsystem over the bus structures. The data arbiter of the storage subsystem is configured to access the priority control parameters when the storage subsystem receives memory access commands either separately or concurrently, and process the memory access commands serially according to the priority designated by the priority control parameters. The priority control parameters may be generated and stored on the storage subsystem in-whole or in-part via driver software executed by one of the host systems.

As one example, a user desiring to use a single storage subsystem to transfer audio, video, and instrumentation log data from separate recording systems may connect all three recording systems to the storage subsystem simultaneously in order to store all of the data in one convenient location instead of three different locations. If the storage subsystem concurrently receives data signals from more than one of the three systems, the data arbiter of the subsystem may prioritize processing of the data according to the priority control parameters stored in the memory of the storage subsystem. The data arbiter may then serially process the data according to the priority of either the signal itself or the host system from which it originated, until all of the data is processed.

The systems and methods disclosed herein advantageously describe a storage subsystem simultaneously connected across multiple host systems, using different signal interfaces and a priority management scheme for handling multiple data access commands. Advantageously, the consolidation of multiple host system data collection needs into a single storage subsystem reduces cost and board space. Yet another advantage disclosed herein is the capability of using multiple methods of interfacing with a storage subsystem for convenient storage or retrieval of data. For example, a storage subsystem may advantageously store data collected by a recording system via one signal interface and may upload data to a personal computer for analysis via another signal interface.

In certain embodiments, a host system may advantageously switch the signal interface and bus structure being used based on changing environmental conditions. If multiple bus structures are used to connect a single host system with a single storage subsystem, then such redundancy may be used to advantageously minimize potential loss of critical data. For example, if one bus structure connecting the host system and the storage subsystem were to cease operation, the host system may revert to another connection to resume data in order to transfer.

Yet another advantageous aspect of the systems and methods disclosed herein is that because the storage subsystem is centrally located, data stored in the memory may be shared across multiple host systems. For example, a host system may view the same data on the storage subsystem through any of the storage subsystem's available bus structures. Such functionality may advantageously be used where a host system has already been developed and a particular signal interface is the only signal interface available, or where a host system uses multiple signal interfaces and the optimal signal interface for the application may be selected. The storage subsystems described herein may also be advantageously used where multiple host systems are used separately to perform different operations with the same storage subsystem, and where each host system uses a different signal interface. In these embodiments, the same data and format may be seen by any host through any signal interface.

Neither this summary nor the following detailed description purports to define the invention. The invention is defined by the claims.

BRIEF DESCRIPTION OF THE DRAWINGS

Systems and methods which embody the various features of the invention will now be described with reference to the following drawings, in which.

DETAILED DESCRIPTION OF PREFERRED EMBODIMENTS

A solid-state storage subsystem, and associated processes that may be implemented by multiple host computing systems, will now be described with reference to the drawings. This description is intended to illustrate preferred embodiments of the invention, and not limit the invention. The invention is defined by the claims.

Figure 1:
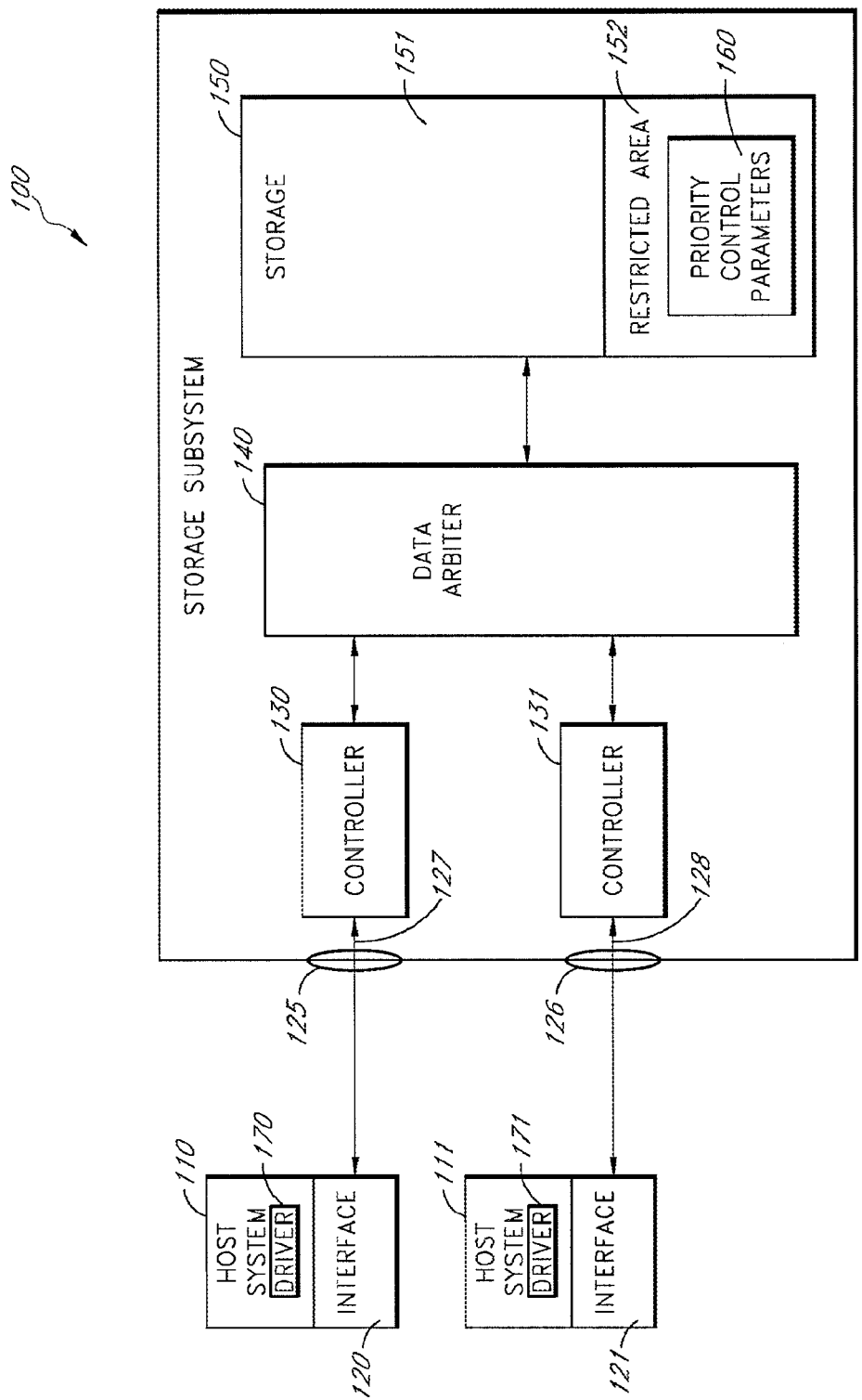
FIG. 1 is a block diagram illustrating multiple host systems linked via multiple bus structures to a storage subsystem containing multiple controllers according to one embodiment.

FIG. 1 is a block diagram illustrating multiple host systems 110 and 111 coupled to a solid-state storage subsystem 100 according to one embodiment. Although two host systems 110 and 111 are shown, any number of host systems may be coupled with storage subsystem 100 according to different embodiments. Each host system 110 and 111 may comprise a computer such as a personal computer, workstation, recording device, router, blade server or any other type of computing device. The host systems 110 and 111 store data on the storage subsystem 100. In some embodiments, operating system functionality and a boot process may be provided by the storage subsystem 100. The host systems 110 and 111 execute driver programs 170 and 171 that provide functionality for communicating with the subsystem 100, such as by issuing commands in accordance with an ATA signal interface or some other interface. In certain embodiments, the drivers 170 and 171 may communicate with, or be part of, one or more software applications that are specifically configured to use the storage subsystem 100.

In one embodiment shown, host systems 110 and 111 further comprise interfaces 120 and 121 respectively. Each interface 120 and 121 may comprise a controller, bus structure, and physical connector corresponding to any industry standard signal interface or any unique signal interface used by the host systems 110 and 111, including but not limited to IDE/PATA, SATA, RS232/423, PCMCIA, USB, Firewire (IEEE-1394), FibreChannel, PCI Express bus, or any wireless communication interface such as Bluetooth or IEEE-802.11. In other embodiments, each host system 110 or 111 may include multiple interfaces.

Storage subsystem 100 is connected to interfaces 120 and 121 of host systems 110 and 111. Storage subsystem 100 comprises physical connectors 125 and 126, bus structures 127 and 128, the controllers 130 and 131, a data arbiter 140, and a storage 150. In the embodiment shown, the interfaces 120 and 121 are specifically connected to the physical connectors 125 and 126 and transmit data to controllers 130 and 131 of the storage subsystem 100 over bus structures 127 and 128. Storage subsystem 100 may comprise at least as many controllers as physical connectors. In other embodiments, the number of controllers included in the storage subsystem 100 may be less than the number of physical connectors of the storage subsystem 100.

Each controller 130 and 131 may be configured to write data to, and read data from, the storage 150 in response to memory/storage access commands from hosts 110 and 111. Controllers 130 and 131 may operate to receive data from interfaces 120 and 121 of host computers 110 and 111 over bus structures 127 and 128. Controllers 130 and 131 may then translate control, address, and data signals into storage access commands to storage 150. Controllers 130 and 131 may also access and transmit data from storage 150 to host systems 110 and 111 through interfaces 120 and 121. The Controllers 130 and 131 may comprise USB, IEEE-1394, IDE, or SATA controllers in some embodiments. In some embodiments, the controllers 130 and 131 may be combined and implemented using a single application-specific integrated circuit (ASIC). In some embodiments, the controllers 130 and 131 may comprise multiple distinct devices. Further, although the controllers 130 and 131 preferably execute firmware, a controller that does not execute a firmware program may be used.

The storage subsystem 100 further comprises a storage 150. In preferred embodiments, storage 150 is a non-volatile memory (NVM) array. Storage 150 may, but need not, be implemented using NAND memory components. Storage 150 may comprise a plurality of solid-state storage devices coupled to controllers 130 and 131 through data arbiter 140. The solid-state storage devices may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices may be physically divided into blocks, pages and sectors, as is known in the art.

In certain embodiments, storage 150 may be formatted into separate partitions. For example, the storage subsystem 100 may create partitions using the systems and methods disclosed in U.S. patent application Ser. No. 11/480,303 titled "Systems and Methods for Segmenting and Protecting a Storage Subsystem" filed on Jun. 30, 2006, which is hereby incorporated by reference in its entirety herein. In alternative embodiments, each partition may support any number of host systems.

In the embodiment shown, storage 150 is accessed through data arbiter 140 by controllers 130 and 131 responding to commands from either host 110 or 111. Controllers 130 and 131, which may be configured to communicate with storage 150, may nonetheless be connected to data arbiter 140. In certain embodiments, the data arbiter 140 may be implemented using an ASIC, field programmable gate array (FPGA), or may comprise multiple distinct devices. In some embodiments, data arbiter 140 may be implemented with additional components in a single device. Further, although the data arbiter 140 also preferably executes firmware, a data arbiter 140 that does not execute a firmware program may also be used.

Data arbiter 140 is responsible for prioritizing read/write commands received simultaneously from multiple controllers 130 and 131 in one embodiment. If data arbiter 140 receives concurrent read/write commands, then according to certain embodiments the data arbiter 140 processes the commands serially according to a priority ranking. For example, data arbiter 140 may first process the command with the highest priority. Once that first command is processed, data arbiter 140 may process a command with the highest remaining priority.

In one embodiment, a restricted memory area 152 of the storage 150 stores priority control parameters 160 which may be used to configure the order in which concurrent storage access commands are processed by the storage subsystem 100 via the data arbiter 140. For instance, the data arbiter 140 may determine that the priority control parameters 160 designate that commands received from the first host system 110 are of highest priority, and are therefore processed before commands received from the second host system 111. In different embodiments, priority control parameters 160 may designate that the priority of a received command be determined based on the host system sending the command, the type of command received, information in the command itself, or some combination of these or other factors.

The restricted memory area 152, and thus the priority control parameters 160, may be accessible via one or more vendor-specific commands, and thus may not be exposed to any host system's operating system. A host system, such as host system 110, may include a driver 170 that may be configured to execute such vendor-specific commands. In some embodiments, a host system using these vendor-specific commands may modify the priority control parameters 160 stored in the restricted memory area 152. The vendor-specific commands may indicate that the priority control parameters 160 should be changed to determine a priority based on the host system transmitting the command, a type of command received, information in the command, or some combination of these or other factors.

In one embodiment, control parameters 160 are stored in a restricted 512-byte block of storage 150. However, the priority control parameters 160 may be stored in any type of non-volatile storage, including register storage that is separate from storage 150. Priority control parameters 160 may advantageously be stored in a predetermined location within restricted area 152 so that data arbiter 140 may be preconfigured to locate priority control parameters 160 when necessary.

By storing priority control parameters 160 in restricted area 152, certain embodiments avoid inadvertent or intentional altering of the control parameters 160 due to the generally inaccessible nature of restricted area 152. For example, a user of either host system 110 or 111 cannot inadvertently copy over the priority control parameters 160 using conventional tools that do not have access to restricted area 152. Other types of information may additionally or alternatively be stored in restricted area 152 and may be accessible using vendor-specific commands.

In certain other embodiments, the priority control parameters 160 may be stored in the user data memory area 151 that is generally accessible by the operating systems of host systems 110 and 111. In one such embodiment, host system 110 further comprises driver 113, which may generate priority control parameters 160. In these embodiments, controls modifying priority control parameters 160 stored in storage 150 may include additional information instructing data arbiter 140 on the location of priority control parameters 160.

Figure 2:
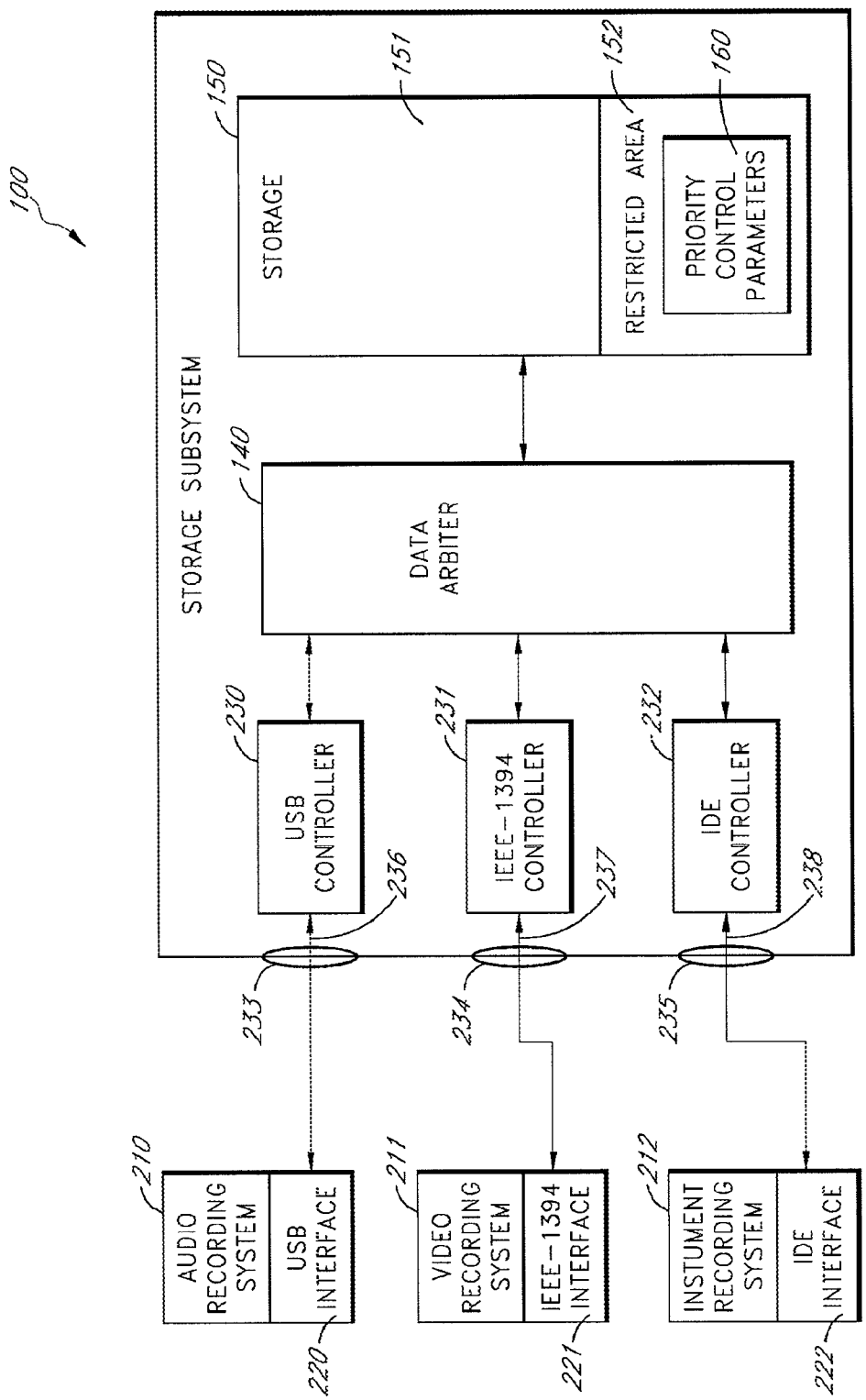
FIG. 2 is a block diagram illustrating multiple host systems linked via multiple bus structures to a solid-state storage subsystem containing multiple controllers according to one embodiment.

FIG. 2 illustrates a block diagram of one embodiment including an audio recording system 210, a video recording system 211, and an instrument recording system 212. Each system may utilize a different signal interface to communicate with storage subsystem 100. For example, the system may transfer audio information from an audio recording system 210 with a USB interface 220 selected because of its low cost and throughput, video information from a video recorder system 211 with an IEEE-1394 interface 221 selected for its high throughput to support video data transfer rates, and instrumentation information from an instrument recording system 212 with an IDE interface 222 selected because it was the most cost effective method for use with a Single Board Computer.

Each recording system may be connected to the storage subsystem 100 with a corresponding physical connector 233, 234, and 235 and over a bus structure 236, 237, and 238. The recording systems may be connected to corresponding controllers 230, 231, and 232. In the embodiment shown, audio recording system 210 is connected to USB controller 230, video recording system 211 is connected to IEEE-1394 controller 231, and instrument recording system 212 is connected to IDE controller 232. Accordingly, physical connector 233 may be a USB mini-A connector, physical connector 234 may be a four-pin Firewire connector, and physical connector 235 may be a CompactFlash card connector. Bus structures 236, 237, and 238 may then correspond to USB, IEEE-1394, and PATA bus structures, respectively. Each controller may receive storage access commands from a host system and translate these signals to access storage 150. Any of the controllers attempting to access storage 150 may send such control, address, and data signals to data arbiter 140. Data arbiter 140 may then forward the signals to storage 150 or may return a busy signal to the originating host system through the controller depending on conditions such as what other signals are being received concurrently and the priority of the signals.

Figure 3:
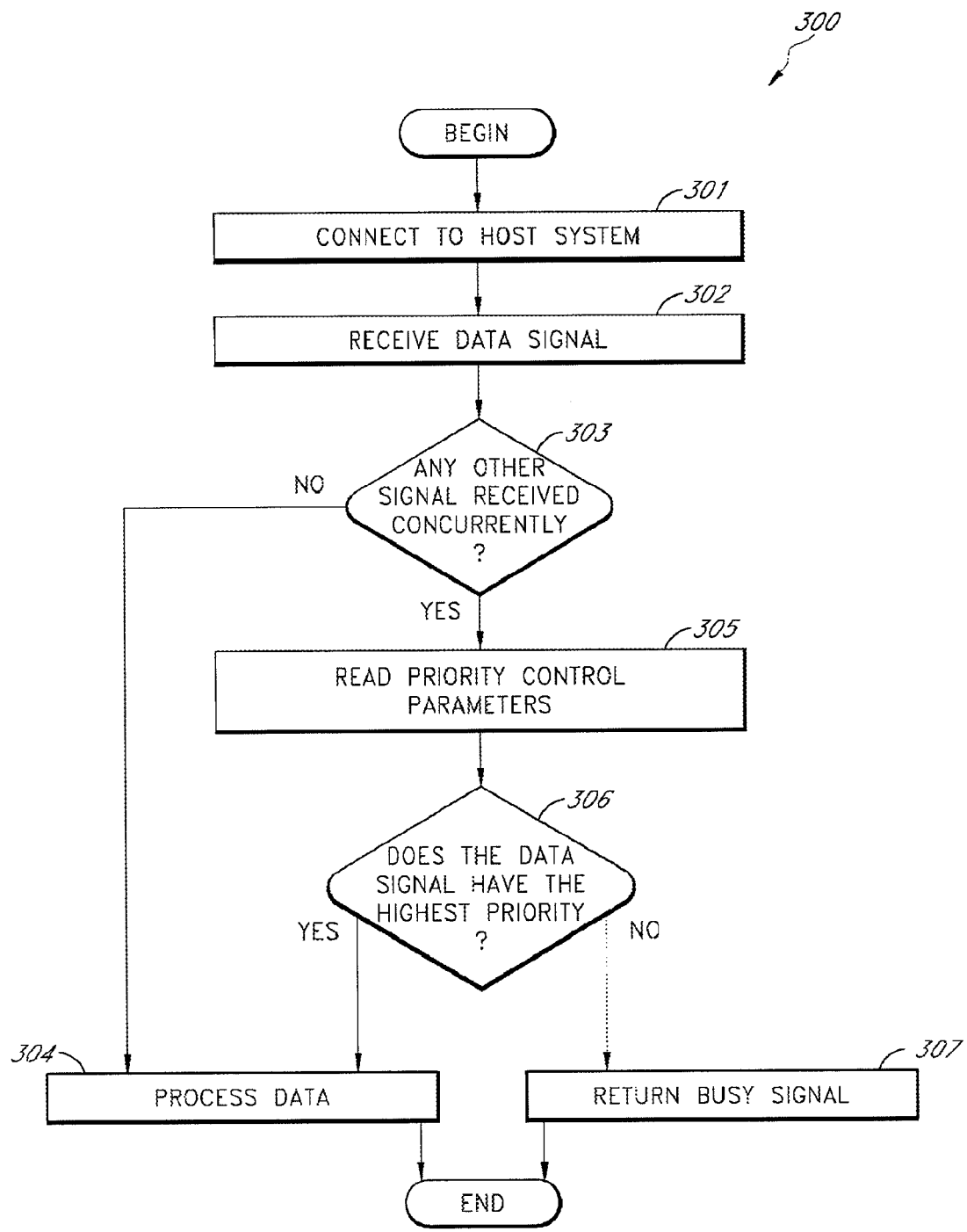
FIG. 3 is a flow chart illustrating a process for handling a memory or storage access command received by a storage subsystem according to one embodiment.

FIG. 3 is a flow chart illustrating a sample process 300 utilized by a data arbiter 140 of a storage subsystem 100 to handle a storage access command received from a host system according to one embodiment. Reference is made to the storage subsystem shown in FIG. 2, but the process shown or a variation may also be utilized by other embodiments. The flow chart shown in FIG. 3 is applicable both to embodiments using a restricted storage area 152 of the storage subsystem 100 to store the priority control parameters 160 as shown in FIG. 2, and to embodiments that use a non-restricted storage area 151 of the storage subsystem 100. Furthermore, the flow chart is applicable to both solid-state storage subsystems and non-solid-state storage subsystems. A skilled artisan will recognize that certain steps of the process 300 may be omitted, modified, or performed in a different order in other embodiments.

First, at step 301, a storage subsystem 100 including a data arbiter 140 is connected to at least one host system. For example, the storage subsystem 100 may be concurrently connected to the USB interface 220 of the audio recording system 210, to the IEEE-1394 interface 221 of the video recording system 211, and the IDE interface 222 of the instrument recording system 212 as shown in FIG. 2.

Next, in step 302, the storage subsystem 100 receives a first read/write command from at least one host system. For example, the storage subsystem 100 may receive a write command from audio recording system 210 through USB interface 220. USB controller 230 translates the command and attempts to access storage 150. This signal is therefore received by data arbiter 140 from controller 230.

In step 303, the data arbiter 140 determines if this signal was received approximately simultaneously with another signal. For example, other signals that might have been received include a write command from video recording system 211 through the IEEE-1394 interface 221 and IEEE-1394 controller 231, or a write command from instrumentation recording system 212 through the IDE interface 222 and IDE controller 232. A concurrent signal may include signals received by the storage subsystem 100 at approximately the same time as well as earlier received signals still being processed. If no other signal was received concurrently with the first read/write command, then the data arbiter 140 proceeds to step 304 and allows that signal to be processed by storage 150 of storage subsystem 100. If another signal was received, then the data arbiter 140 proceeds to step 305.

At step 305, the data arbiter 140 of the storage subsystem 100 reads the priority control parameters 160 from the storage 150 of the storage subsystem 100. In the embodiment shown in FIG. 2, the priority control parameters 160 are stored in and read from the restricted memory area 152. The priority control parameters 160 may designate a priority for processing the concurrently received signals. In one embodiment of the system of FIG. 2, this may comprise giving the video recording system 211 highest priority, the audio recording system 210 second highest priority, and instrument recording system 212 lowest priority.

At decision step 306, the data arbiter 140 uses the priority control parameters 160 to determine whether the pending read/write command is the highest priority command. For example, if the priority control parameters 160 designate that a concurrently received write command for video data from the IEEE-1394 interface 221 would be considered highest priority, then the write command for audio data from the USB interface 220 would not be the highest priority signal and data arbiter 140 would handle the audio data signal by proceeding to step 307. At step 307, the data arbiter 140 provides a busy signal to the host system from which the signal originated. Alternatively, if the priority control parameters 160 designate that the audio signal was the highest priority signal of those received, then the data arbiter 140 would proceed to step 304 and the signal would be processed.

Steps 304 and 307 describe alternatively processing a received command or returning a busy signal. The step of processing a command may include additional actions such as performing handshake procedures to verify the receipt and handling of the signal in certain embodiments depending on the communication protocol used. Similarly, the step of returning a busy signal may not require an actual return signal be sent in some embodiments where the communications protocol requires the data be resent by the host system until received and confirmed.

Figure 4:
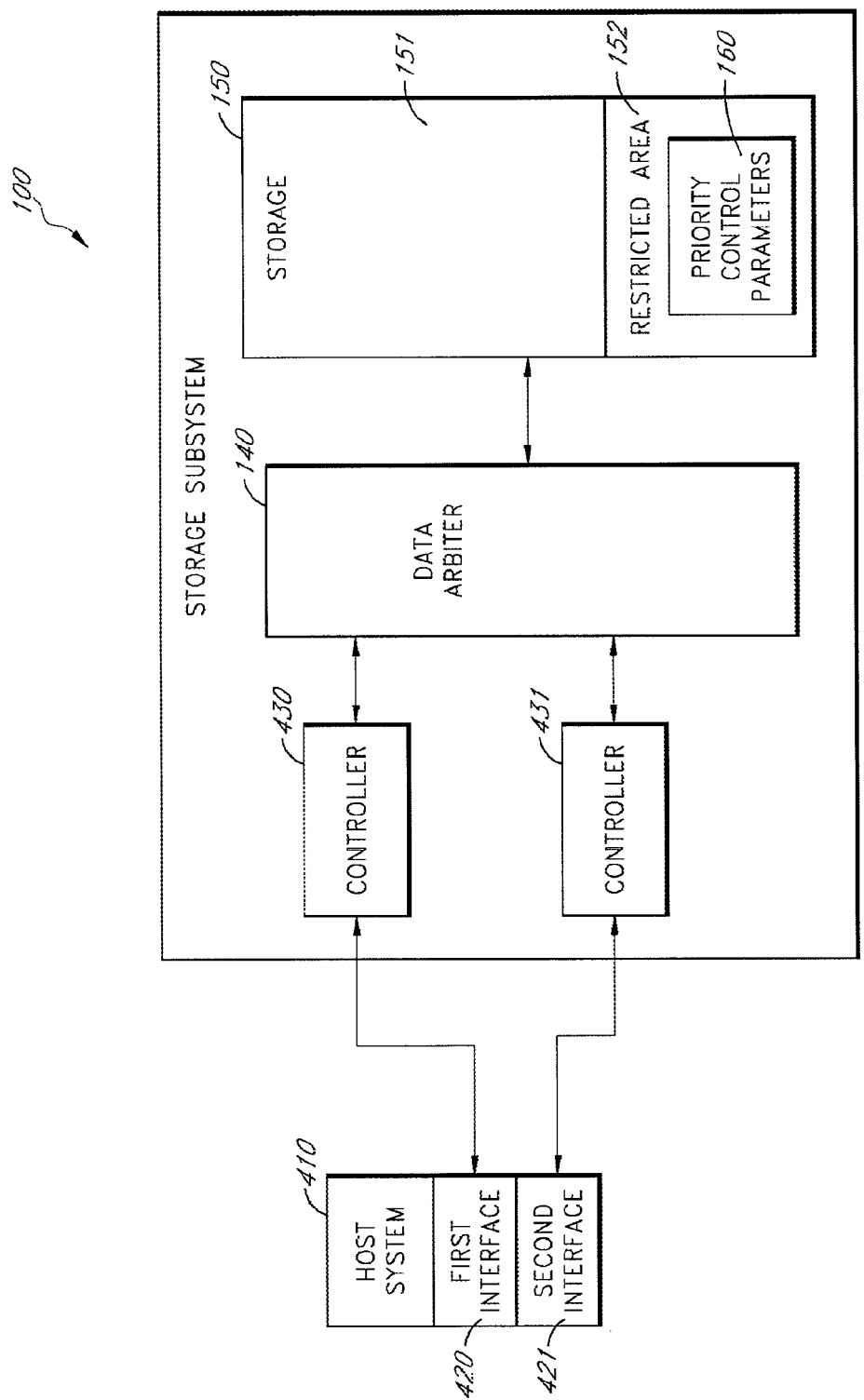
FIG. 4 is a block diagram illustrating a host system linked via two bus structures to a solid-state storage subsystem according to one embodiment.

FIG. 4 is a block diagram illustrating a single host system 410 linked via two interfaces 420 and 421 to a storage subsystem 100 containing two controllers 430 and 431 according to one embodiment of the invention. The embodiment illustrated is advantageously configured for redundancy in case a primary interface should cease operation. Without redundancy, critical data may be lost if the primary interface were to cease operation. For example, if the interface 420 connected to the controller 430 ceased operating, then the host system 410 could alternatively use the interface 421 connected to the second controller 431 without significant downtime or loss of data.

Figure 5:
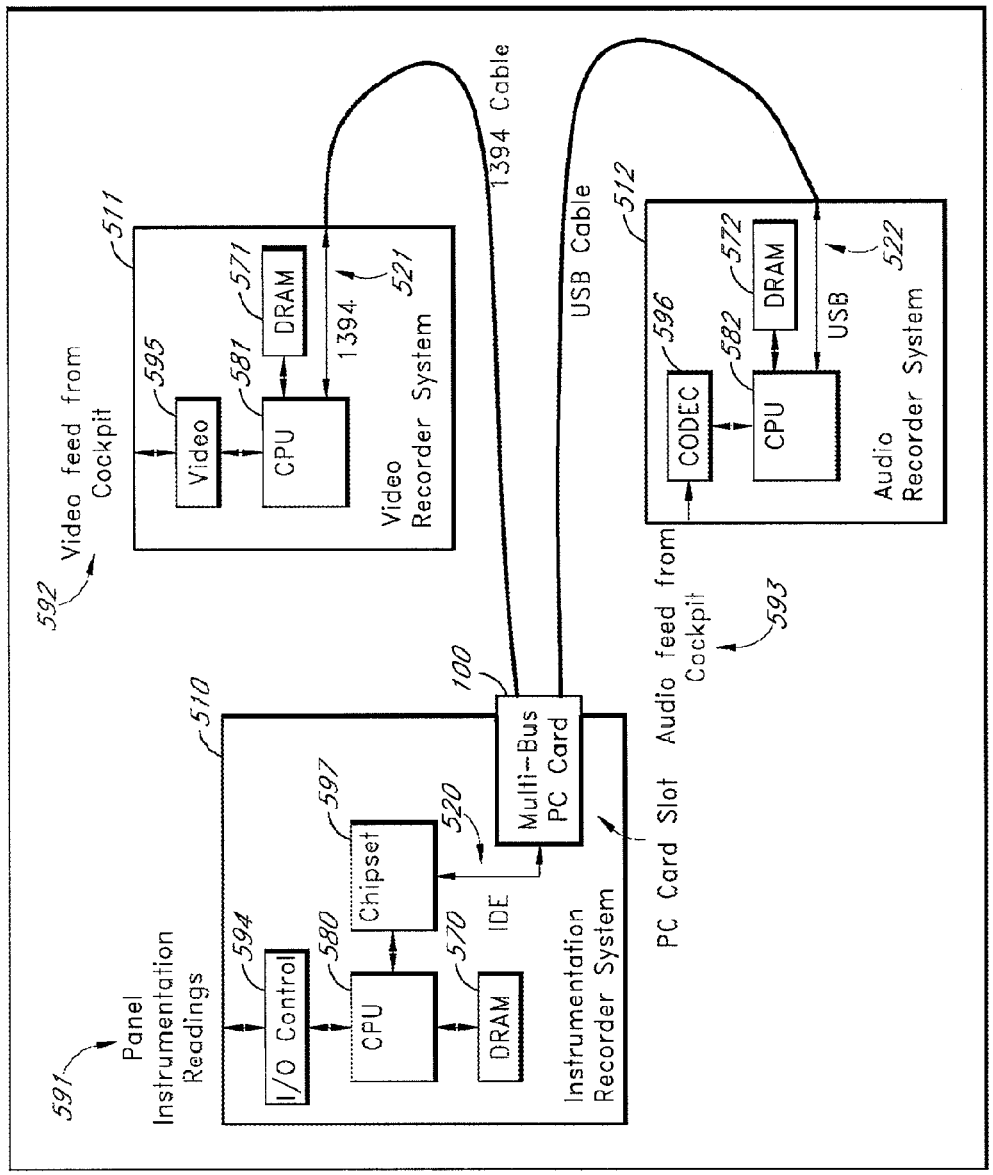
FIG. 5 is a block diagram illustrating a solid-state storage subsystem connected to three instrument recording systems according to one embodiment.

FIG. 5 is a diagram illustrating a storage subsystem 100 connected to three computing systems 510, 511, and 512 in an aircraft system. The computing systems include instrumentation recorder system 510, a video recorder system 511, and an audio recorder system 512. Storage subsystem 100 comprises a portable memory device having a card type form factor. As shown in FIG. 5, storage subsystem 100 has a PC Card form factor. Storage subsystem 100 thus is inserted into a PC Card slot connector in instrumentation recorder system 510 and is connected to the CPU 580 through a chipset 597 of the instrumentation recorder system 510 via an IDE bus structure 520. Instrumentation recorder system 510 collects panel instrumentation readings 591, which are processed by I/O control 594. I/O control 594 communicates with CPU 580. CPU 580 may store data in volatile storage DRAM 570, and may also transmit storage access commands over IDE bus structure 520 to storage subsystem 100. For example, panel instrumentation readings 591 may be stored on storage subsystem 100.

Storage subsystem 100 is further connected to the video recorder system 511 via an IEEE-1394 cable and bus structure 521. A video feed 592 is processed by video card 595. Video data is transmitted to CPU 581. Video recorder system 511 further comprises DRAM 571 connected to CPU 581, and video data may be temporarily stored in DRAM 571 or some other storage of the video recorder system 511. CPU 581 transmits storage access commands over IEEE-1394 bus structure 521 to storage subsystem 100. For example, video recorder system 511 may store recorded video data on storage subsystem 100.

Storage subsystem 100 is further connected to audio recorder system 512 via a USB cable and USB bus structure 522. Audio recorder system 512 collects audio data 593 from the cockpit which is encoded by codec 596 and transferred to CPU 582. CPU 582 may store data on DRAM 572 and may transmit storage access commands and data to storage subsystem 100. Storage subsystem 100 may therefore store audio data 593.

Accordingly, storage subsystem 100, comprising a PC Card form factor having at least three physical connectors and bus structures for utilizing at least three signal interfaces, may be connected to a first instrument recorder system 510 while simultaneously recording data from a video recorder system 511 and audio recorder system 512. As discussed in more detail above, storage subsystem 100 may be configured to prioritize data received concurrently from the three recording systems 510, 511, and 512. For example, because video data may require more memory and may not be easily stored on DRAM 570 of instrument recorder system 511, video data captured by video recorder system 511 and transferred to storage subsystem 100 may have priority over instrumentation readings and audio recordings.

Figure 6:
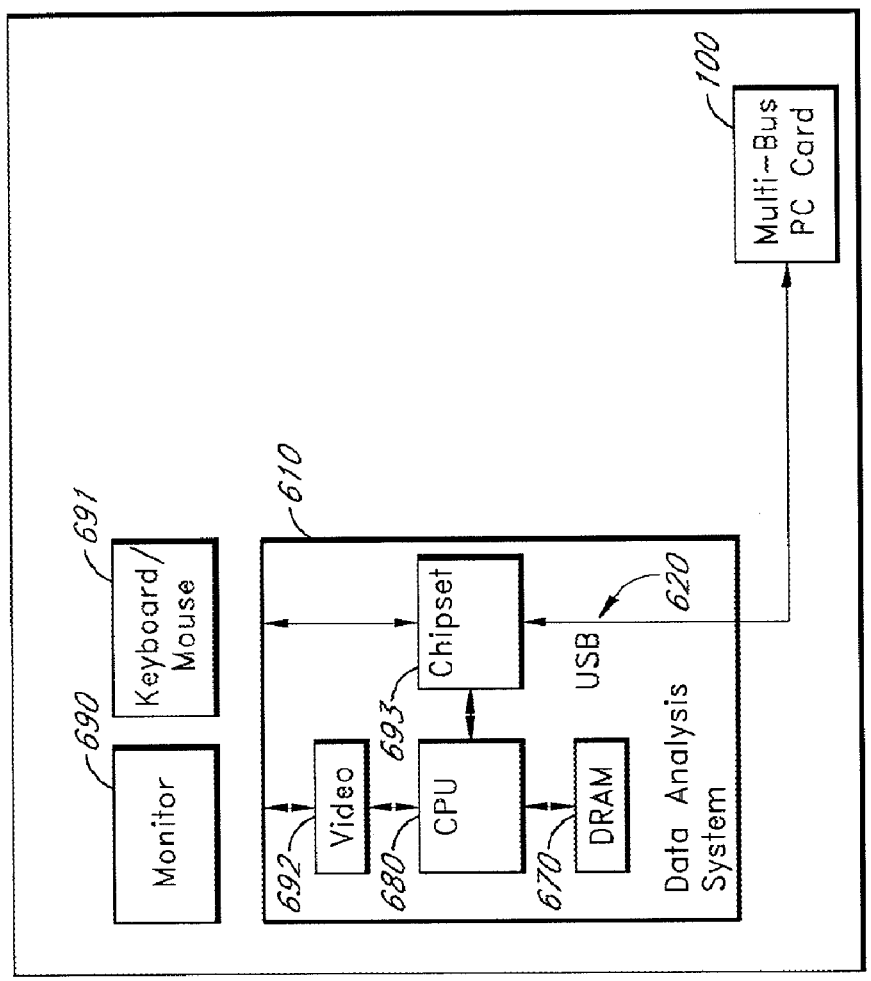
FIG. 6 is a block diagram illustrating a storage subsystem connected to a data analysis system according to one embodiment.

FIG. 6 shows storage subsystem 100 after it has been disconnected from the aircraft recording system shown in FIG. 5. Storage subsystem 100 may now be connected to a data analysis system 610. For example, data analysis system 610 may be a personal computer having software installed for the analysis of recorded flight data. Data analysis system 610 connects to storage subsystem 100 using USB bus structure 620. Data analysis system 610 comprises a chipset 693 configured to interpret USB signal interface data collected from storage subsystem 100, chipset 693 may also handle keyboard and mouse input 691. Chipset 693 transmits data to CPU 680. Data analysis system 610 may further comprise volatile storage DRAM 670 and additional non-volatile storage (not shown). Data analysis system 610 may further comprise video card 692. Monitor 690 may be connected to video card 692 of data analysis system 610.

Data collected from the audio recording system 512, video recording system 511, and instrument recording system 510 as shown in FIG. 5 may be stored on data analysis system 610. By collecting all the information on the single storage subsystem 100, the data may be easily transferred to data analysis system 610 and analyzed together. Transfer of data from storage subsystem 100 may utilize whichever signal interface is available, convenient, and efficient for data analysis system 610.

Figure 7:
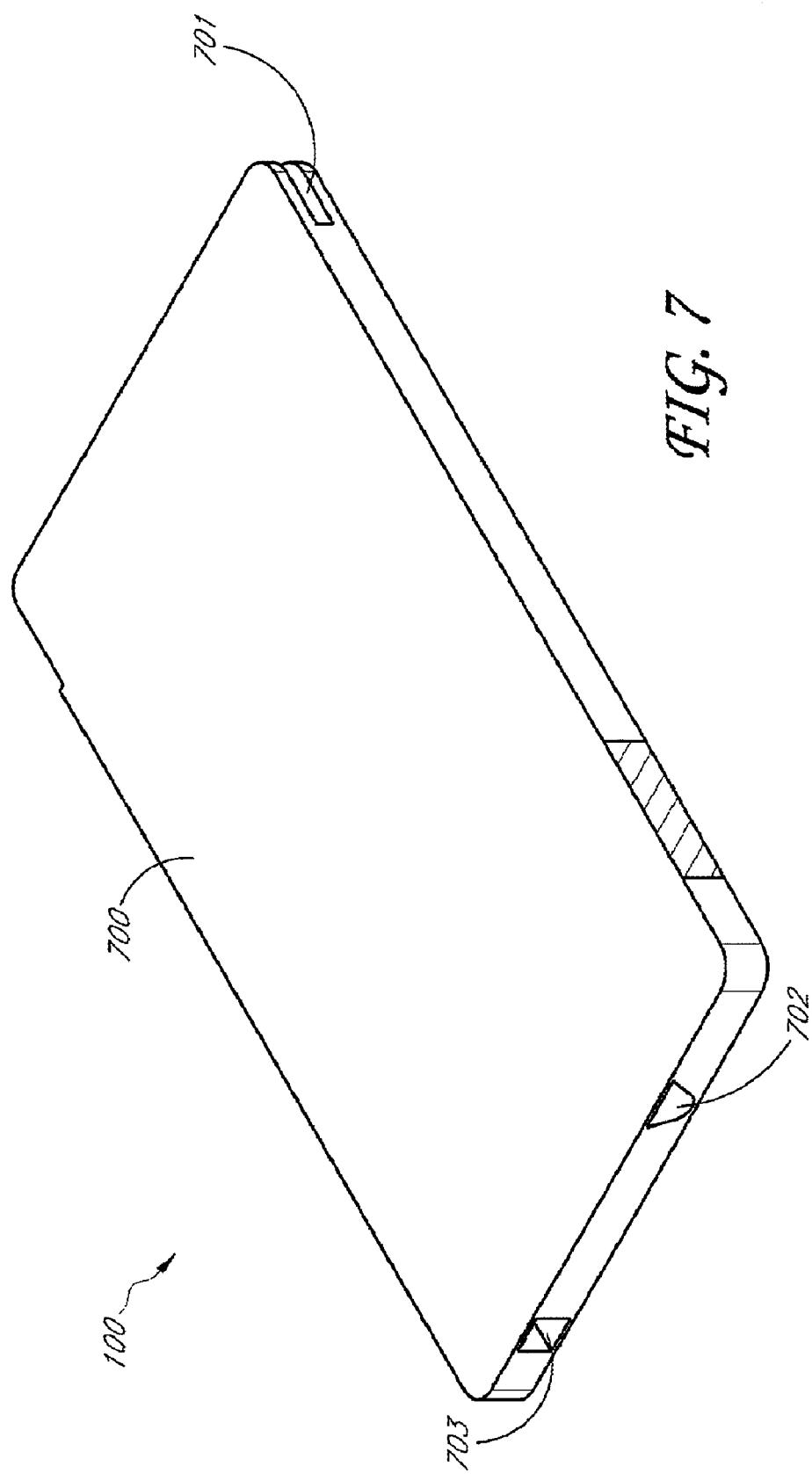
FIG. 7 is a diagram illustrating a storage subsystem having a PC Card form factor and utilizing three signal interfaces according to one embodiment.

FIG. 7 shows one embodiment of a storage subsystem 100 having a PC Card form factor. Storage subsystem 100 is shown with a PC Card housing 700. Storage subsystem 100 shown in FIG. 7 includes three physical connectors 701, 702, and 703. Physical connector 701 comprises a PC Card connector, and is connected with a PC Card bus structure to a controller. Physical connector 702 comprises a USB mini-A connector and is connected to a USB connector over a USB bus structure. Physical connector 793 comprises an IEEE-1394 four-pin connector, and is connected to an IEEE-1394 controller using IEEE-1394 bus structure. The storage subsystem 100 is advantageously configured to be inserted into a PC Card slot on a host system. When storage subsystem 100 is inserted into a PC Card slot, PC Card physical connector 701 connects the storage subsystem 100 with the host system. Physical connector 702 and 703 are further accessible to be connected to USB and IEEE-1394 cable connections from additional host systems.

Figure 8:
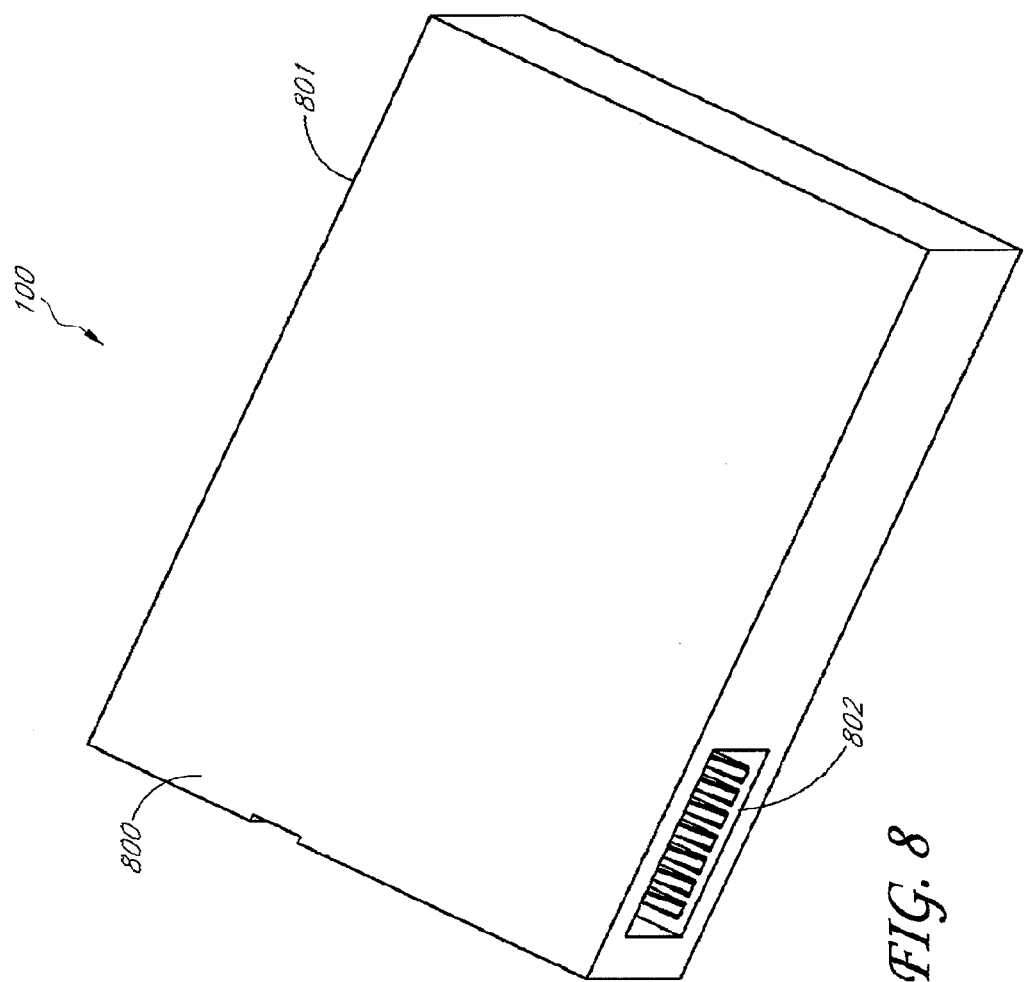
FIG. 8 is a diagram illustration a storage subsystem having a CompactFlash form factor and utilizing two signal interfaces according to one embodiment.

FIG. 8 shows a storage subsystem 100 having a CompactFlash form factor. Storage subsystem 100 has a CompactFlash card housing 800. Storage subsystem 100 further comprises a physical connector 801, comprising a CompactFlash physical connector. An ATA bus structure is connected between the physical connector 801 and an IDE controller. Additional physical connectors are shown on the opposite side of the CompactFlash card housing of storage subsystem 100. For example, the physical connectors may comprise USB or IEEE-1394 connectors. In other embodiments, different connectors may be accessible on the opposite side of the storage subsystem 100. For example, an SATA connector 802 may be available. The physical connectors are connected to controllers via bus structures configured to transmit data using the corresponding signal interfaces of the physical connectors. A data arbiter is connected between the controllers and a memory of the storage subsystem 100 in order to prioritize concurrently received storage access commands.

Different embodiments of the system may employ a variety of form factors in addition to those described above. In some embodiments, the storage subsystem 100 may comprise a CompactFlash Card form factor storage solution. This storage subsystem may utilize, for example, non-volatile memory devices, volatile memory devices, or an electro-mechanical hard disk drive. In one such embodiment, the storage subsystem comprises a CompactFlash connector using a PATA signal interface along with a SATA connector and signal interface in a single product in an industry standard CompactFlash form factor. In another such embodiment, the storage subsystem may comprise a CompactFlash connector and PATA signal interface along with an IEEE-1394 connector and interface in an industry standard CompactFlash form factor. Other embodiments using a CompactFlash form factor may alternatively or additionally include a USB connector and signal interface.

Other embodiments of storage subsystem 100 may comprise a PC Card form factor storage solution comprising non-volatile memory devices, volatile memory devices, or an electro-mechanical hard disk drive. In this embodiment, the storage subsystem 100 may comprise a PC Card connector using a PATA signal interface and a SATA connector and signal interface in a single product in an industry standard PC Card form factor. Other such embodiments may alternatively or additionally comprise an IEEE-1394 connector and signal interface or a USB connector and signal interface.

In other embodiments, storage subsystem 100 may comprise another form factor storage solution, such as a hard disk form factor (e.g. 3.5", 2.5", 1.8", etc.) storage solution, a custom form factor storage solution, or some other form factor storage solution. Connectors and signal interfaces utilized in a given embodiment of storage subsystem 100 may be adapted to comprise some combination of signal interfaces such as PATA, SATA, RS232/423, PCMCIA, USB, Firewire (IEEE-1394), FibreChannel, PCI Express bus, or any wireless interface. In further embodiments, other combinations and greater numbers of signal interfaces and controllers may be used within a single storage subsystem.

In some embodiments, the storage subsystem 100 may, for example, be a solid-state memory card that connects to an interface of each host system 110 and 111 with at least one of the following card specifications: CompactFlash, PCMCIA, SmartMedia, MultiMediaCard, SecureDigital, Memory Stick, ATA/ATAPI. The storage subsystem 100 may, for example, have a housing and signal interfaces that comply with one of the following specifications: sub 1 inch hard disk drive, 1.8 inch hard disk drive, 2.5 inch hard disk drive and 3.5 inch hard disk drive. A custom form factor and/or signal interface may alternatively be used.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory card, comprising:
   a card housing which houses a non-volatile memory and controller circuitry; and
   a first external connector corresponding to a first signal interface and a second external connector corresponding to second signal interface, said first and second external connectors enabling multiple host systems to connect to and use the memory card simultaneously using different respective bus structures;
   wherein the controller circuitry is capable concurrently receiving memory access commands via the first and second external connectors using the first and second bus structures, and is additionally capable of prioritizing the received memory access commands such that memory access commands received via one of the two external connectors are given priority over memory access commands received via the other external connector.

2. The memory card of claim 1, wherein the controller circuitry implements a command that enables a host system to specify how the memory access commands received via the first and second external connectors are to be prioritized relative to each other.

3. The memory card of claim 1, wherein the controller circuitry is capable of partitioning the non-volatile memory such that a first partition is allocated to the first external connector and the second partition is allocated to the second external connector.

4. The memory card of claim 1, wherein the card housing has a CompactFlash form factor.

5. The memory card of claim 4, wherein the first external connector is a CompactFlash connector and the second connector is a Serial ATA connector.

6. The memory card of claim 5, wherein the CompactFlash and Serial ATA connectors are positioned along opposite edges of the card housing so that the Serial ATA connector is accessible when the memory card is plugged into a CompactFlash card slot.

7. The memory card of claim 5, wherein the controller circuitry is configured to use a parallel ATA signal interface to receive and process commands via the CompactFlash connector, and is configured to use a Serial ATA signal interface to receive and process commands via the Serial ATA connector.

8. The memory card of claim 1, wherein the card housing has a PC Card form factor, and the first external connector is a PC Card connector.

9. The memory card of claim 8, wherein the PC Card connector and the second external connector are provided along opposite edges of the card housing, such that the second external connector is accessible when the memory card is plugged into a standard PC Card slot.

10. The memory card of claim 8, wherein the second external connector is a mini USB connector.

11. The memory card of claim 10, further comprising an external FireWire connector coupled to the controller circuitry, wherein the controller circuitry is capable of concurrently receiving memory access commands over the PC Card, mini USB and FireWire external connectors concurrently.

12. A storage subsystem, comprising:
a memory configured to store data;
at least one priority control parameter stored in the memory;
a first controller connected to a first physical connector of a first type and configured to process memory access commands received over the first physical connector according to a signal interface of a first type;
a second controller connected to a second physical connector of a second type and configured to process memory access commands received over the second physical connector according to a signal interface of a second type; and
a data arbiter connected to the first and second controllers and to the memory, the data arbiter configured to receive a first set of processed data from the first controller and a second set of processed data from the second controller, the data arbiter further configured to transmit the first and second sets of processed data according to a priority order, wherein the priority order is based at least in part on the at least one priority control parameter.

13. The storage subsystem of claim 12, wherein the memory is a non-volatile memory.

14. The storage subsystem of claim 12, wherein the memory comprises at least one memory device, and wherein the at least one memory device comprises at least one of: a flash integrated circuit, a C-RAM device, a PC-RAM device, a PMC-RAM, an OUM, an RRAM device, a NAND memory device, a NOR memory device, an EEPROM device, an FeRAM device, and a magnetic storage device.

15. The storage subsystem of claim 12, wherein the at least one priority control parameter indicates that the first set of processed data is ranked ahead of the second set of processed data in the priority order.

16. The storage subsystem of claim 12, wherein the first type signal interface is a PATA signal interface and the first type physical connector comprises one of: a PC Card connector, a SmartCard adapter, and a CompactFlash adapter.

17. The storage subsystem of claim 12, wherein the first and second type signal interfaces correspond to different types of signal interfaces, and wherein the first and second type physical connectors correspond to different type physical connectors.

18. The storage subsystem of claim 12, wherein the first physical connector is a CompactFlash card connector.

19. The storage subsystem of claim 18, wherein the second physical connector comprises one of a USB series A connector receptacle, a USB series B receptacle, a USB mini-A receptacle, a USB mini-B receptacle, and a Micro USB connector.

20. The storage subsystem of claim 18, wherein the second physical connector is an SATA connector.

21. The storage subsystem of claim 18, wherein the second physical connector comprises one of a four-pin FireWire connector receptacle, a six-pin FireWire connector receptacle, and a nine-pin FireWire connector receptacle.

22. The storage subsystem of claim 12, wherein the first physical connector is a PC Card connector.

23. The storage subsystem of claim 22, wherein the second physical connector comprises one of a USB connector, a FireWire connector, and an SATA connector.

24. The storage subsystem of claim 12, further comprising:
a third controller connected to a third physical connector of a third type and configured to process memory access commands received over the third physical connector according to a signal interface of a third type; and
the data arbiter additionally connected to the third controller and configured to receive the third set of processed data from the third controller, the data arbiter further configured to transmit the first, second, and third sets of processed data according to the priority order.

25. The storage subsystem of claim 24, wherein the first type physical connector comprises a USB connector, the second type physical connector comprises a FireWire connector, and the third type physical connector comprises a card-type connector, and wherein the first type signal interface corresponds to a USB signal interface, the second type signal interface corresponds to a FireWire signal interface, and the third type signal interface corresponds to an IDE signal interface; and
wherein the storage subsystem is configured to substantially adhere to a PC Card form factor.

26. A method of handling multiple data requests performed by a data arbiter of storage subsystem having a portable card type form factor and including a plurality of physical connectors connected to a plurality of controllers, the data arbiter connected to the plurality of controllers and a memory, the method comprising:
receiving a first data request from a first one of the plurality of controllers;

determining if a second data request has been received from a second one of the plurality of controllers;

processing the first data request when the second data request has not been received;

determining if the first data request should be processed before the second data request when the second data request has been received, the determination based at least in part on at least one priority control parameter;

transmitting a busy signal to the first one of the plurality of controllers when it is determined that the second data request should be processed before the first data request; and processing the first data request when it is determined that the first data request should be processed before the second data request.

27. The method of claim 26, wherein the first data request comprises one of: a request to write data to the memory, a request to read data from the memory, and a request to erase a portion of the memory.

28. The method of claim 27, wherein the second data request comprises one of: a request to write data to the memory, a request to read data from the memory, and a request to erase a portion of the memory.

29. The method of claim 26, further comprising:

generating the first data request from a first type data signal received by the controller from a first host system; and generating the second data request from a second type data signal received by the controller from a second host system.

30. The method of claim 29, wherein the first type data signal corresponds to a signal interface selected from: a USB signal interface, a FireWire signal interface, an IDE signal interface, and an SATA signal interface.

31. The method of claim 29, wherein the second type data signal corresponds to a signal interface selected from: a USB signal interface, a FireWire signal interface, an IDE signal interface, and an SATA signal interface.

32. The method of claim 26, further comprising:

processing the second data request when it is determined that the second data request should be processed before the first data request.

33. The method of claim 32, further comprising:

determining if a new data request should be processed before the first data request based at least in part on the at least one priority control parameter.

34. The method of claim 33, further comprising:

terminating the busy signal and processing the first data request when it is determined that the new data request should not be processed before the first data request.

35. A storage subsystem configured to receive a plurality of data signals from one or more host systems utilizing a plurality of signal interfaces, the storage subsystem comprising:

a non-volatile storage configured to store data, the non-volatile storage comprising an unprotected access area and a restricted access area;

at least one priority control parameters stored in the restricted access area;

a data arbiter connected to the non-volatile storage;

a USB controller connected to the data arbiter and configured to process a USB data signal received from one of the one or more host systems, the USB controller further configured to transmit the processed USB data signal to the data arbiter, wherein the received USB data signal corresponds to a non-volatile storage access;

a Firewire controller connected to the data arbiter and configured to process a FireWire data signal received from one of the one or more host systems, the FireWire controller further configured to transmit the processed FireWire data signal to the data arbiter, wherein the received FireWire data signal corresponds to a non-volatile storage access;

an IDE controller connected to the data arbiter and configured to process an IDE data signal received from one of the one or more host systems, the IDE controller further configured to transmit the processed IDE data signal to the data arbiter, wherein the received IDE data signal corresponds to a non-volatile storage access; and wherein the data arbiter is configured to access the restricted area of the non-volatile storage, and wherein the data arbiter is configured to determine a priority corresponding to the processed USB, FireWire, and IDE data signals based at least in part on the at least one priority control parameters, and wherein the data arbiter is configured to transmit one of the processed USB, FireWire, and IDE data signals to the non-volatile storage based at least in part on the determined priority and to transmit a busy signal to the two controllers corresponding to the other two of the processed USB, FireWire, and IDE data signals.

* * * * *

UNITED STATES PATENT AND TRADEMARK OFFICE
CERTIFICATE OF CORRECTION

PATENT NO. : 7,685,374 B2  Page 1 of 1
APPLICATION NO. : 11/829023
DATED : March 23, 2010
INVENTOR(S) : Diggs et al.

It is certified that error appears in the above-identified patent and that said Letters Patent is hereby corrected as shown below:

Col. 10, Line 62, Claim 1: After "capable" and before "concurrently" insert --of--.

Signed and Sealed this

Twenty-eighth Day of September, 2010

David J. Kappos
*Director of the United States Patent and Trademark Office*